US006586708B1

(12) United States Patent
Cusick, III

(10) Patent No.: US 6,586,708 B1
(45) Date of Patent: Jul. 1, 2003

(54) WATER VAPOR COOLED NOZZLE USED IN THE MIG AND TIG ARC WELDING PROCESS

(76) Inventor: Joseph B. Cusick, III, 1413 N. Estate Rd., Peck, KS (US) 67120

( * ) Notice: Subject to any disclaimer, the term of this patent is extended or adjusted under 35 U.S.C. 154(b) by 0 days.

(21) Appl. No.: 09/945,525

(22) Filed: Sep. 4, 2001

(51) Int. Cl.⁷ .................................................. B23K 9/00
(52) U.S. Cl. ........................ 219/137.62; 219/74; 219/75
(58) Field of Search ............................ 219/137.62, 126, 219/136, 137 R, 74, 75

(56) References Cited

U.S. PATENT DOCUMENTS

| | | | | |
|---|---|---|---|---|
| 2,929,912 A | * | 3/1960 | Lesnewich | 219/74 |
| 3,018,360 A | * | 1/1962 | Engel | 219/137.62 |
| 3,296,412 A | * | 1/1967 | Waite et al. | 219/126 |
| 3,309,492 A | * | 3/1967 | Fields | 219/74 |
| 3,803,381 A | * | 4/1974 | Bernard et al. | 219/137.62 |
| 3,944,781 A | * | 3/1976 | Urbanic et al. | 219/137 R |
| 4,864,099 A | * | 9/1989 | Cusick, III et al. | 219/137.62 |
| 5,248,868 A | * | 9/1993 | Cusick, III | 219/137.62 |
| 6,005,221 A | * | 12/1999 | Cusick, III | 219/137.62 |

* cited by examiner

Primary Examiner—Clifford C. Shaw
(74) Attorney, Agent, or Firm—Bradley P. Sylvester

(57) ABSTRACT

An improved welding apparatus, for use with a MIG apparatus, or a tungsten rod in a TIG apparatus. A nozzle housing, having an outer shroud, defines an airspace, which receives an injection of water vapor mist. The water vapor mist, when directed into the airspace in the nozzle housing, contacts the heated nozzle housing surface, and is then able to absorb the heat energy from the nozzle housing surface. When the water vapor mist absorbs heat energy, it undergoes a phase change from atomized water into steam. The steam is allowed to exit out of the rear portion of the rear of the nozzle assembly.

The phase change of water to steam provides a significant heat transfer, due to the latent heat energy absorption capability of the water that is required to convert it from a liquid state to a gaseous state. This cooling apparatus, and method of cooling, both utilize a minimal amount of water usage, and also dramatically extends the usable life of the welding apparatus.

14 Claims, 1 Drawing Sheet

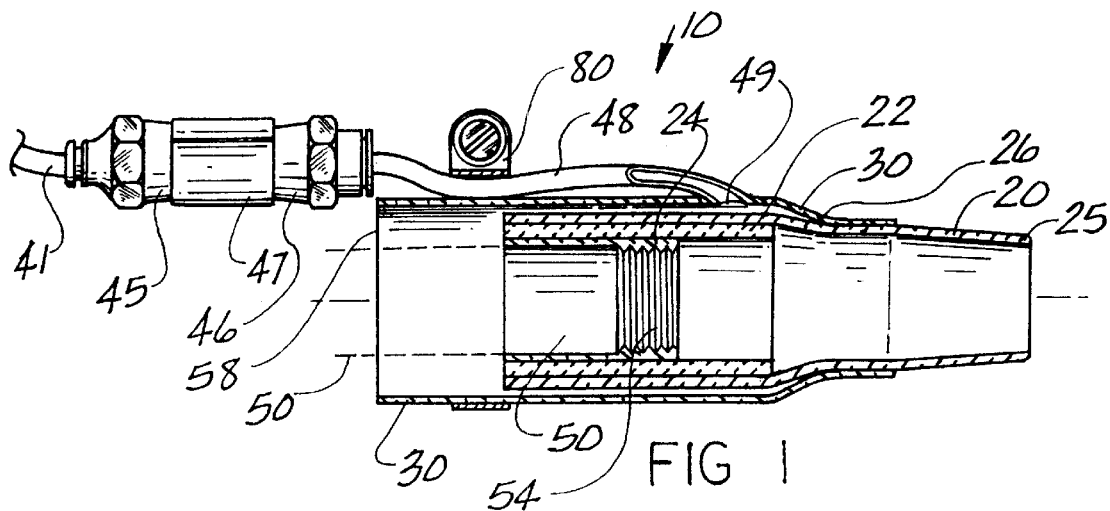
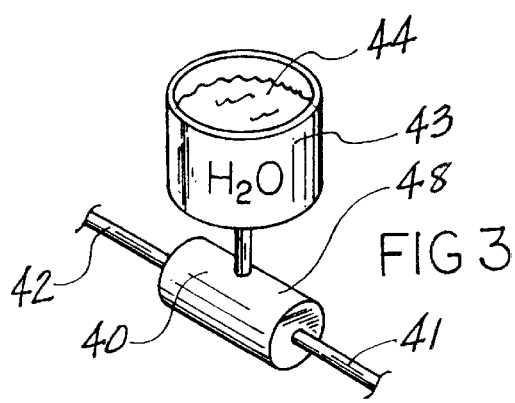
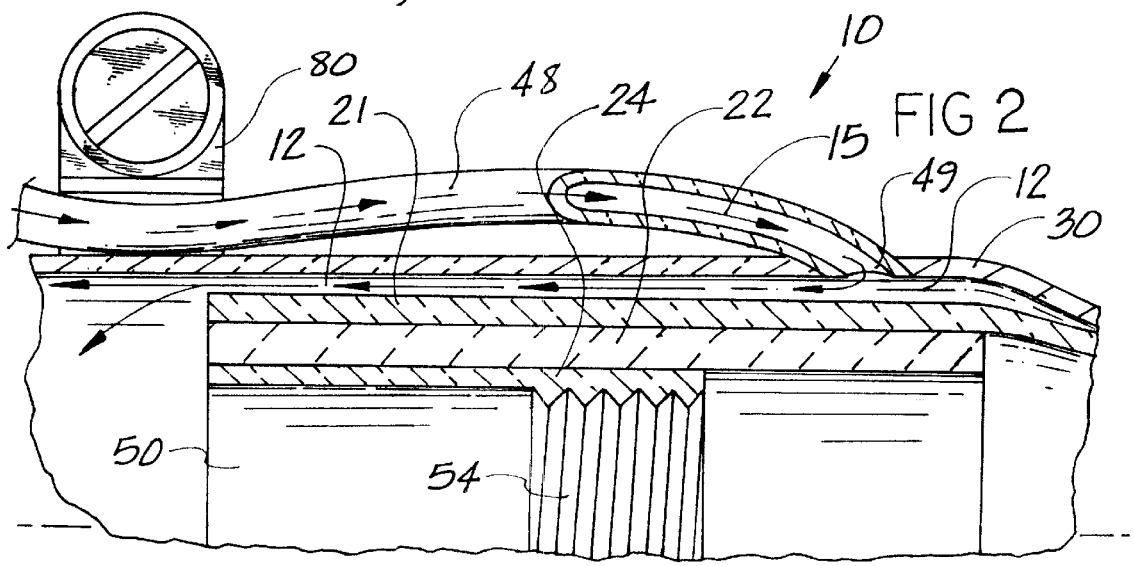

WATER VAPOR COOLED NOZZLE USED IN THE MIG AND TIG ARC WELDING PROCESS

BACKGROUND OF THE INVENTION

In the art of arc welding, particularly in the area using inert gas as a shield, (commonly known in the art as metal inert gas or "MIG" systems), generated heat is extensive, being in excess of 10,000 to 12,000 degrees Fahrenheit, at the arc point. It is not uncommon for heat to be transferred to metal parts of the welding apparatus in excess of 1,000 degrees Fahrenheit. There have been multiple ongoing efforts to remove generated heat from these type of welding units and similar units. Excessive heat makes workers uncomfortable, but it also degrades the working apparatus much more quickly during high temperature heat exposure. Replacement of the arc welding apparatus parts that degrade is an expensive and time-consuming process.

When robotic welding units are used, the loss of time required for maintenance becomes significant. For this reason and others, efforts to remove the built-up heat generated during the welding process has been ongoing, but thus far no system has realized a truly efficient process.

Some of the earlier attempts at cooling the welding apparatus is exemplified in U.S. Pat. No. 4,864,099 (Cusick), entitled "Water cooled semi-automatic welding gun". This invention utilized a liquid cooled welding gun assembly. Power, gas and cooling liquid hoses were contained within the cable assembly and intercommunicated the connector block of the welding gun assembly with the rear connector block. This welding gun assembly included a liquid cooled nozzle assembly, with internal cooling passages. Although liquids showed a great propensity for cooling, the amount of water to be used in removing the heat because burdensome, and further improvements were needed.

Referring now also to U.S. Pat. No. 5,670,073 (Kiilunen), entitled "Water cooled gas metal arc welding gun", a water cooled gas metal arc welding (MIG) gun was disclosed in which a water cooling system for the gun barrel introduced coolant water at the bottom of the barrel to create a coolant water flow through the gun. One of the goals and benefits of this invention was that it did not allow the coolant water to stagnate and heat up. Again, the amount of water and burden of maintenance made this particular welding apparatus problematic for heavy use. Another dangerous use of water in the TIG and MIG welding systems was the significant levels of electricity used in the welding process, which made a water leak extremely hazardous, due to electrical shock.

Water generally presents other problems to the welding processes, beyond increasing the danger of electrical shock. Water intrusion into the welding process often degrades the welding quality of the finished product. There have been numerous patents directed to avoiding the use of water exposure to the welding process. For example, in U.S. Pat. No. 6,153,847 (Nakatani et al.), entitled "Welding member and welding method" a water-repellent film was applied directly onto the surface of a welding member between two mating welding bevels, a welding bevel of a base member to be welded, and a coated welding rod formed by coating a metallic core wire with a flux. The water-repellent film was formed of a hydrophobic material having a contact angle of 90.degree. or above and providing minute concavities and convexities. Thus, in a highly humid environment, during rainfall or even in water, welding could be effected without weld defects such as blow holes, cracks and the like.

In a effort to avoid the problems associated with water cooled systems, further improvements were made. Referring now to U.S. Pat. No. 5,248,868 (Cusick), entitled "Melding gun" (corrected title is "Welding gun") Cooling in this instance was accomplished through a plurality of open recesses or channels whereby pressurized air was conveyed. This welding gun assembly also included a pressurized air cooled nozzle assembly. In this invention, pressurized and refrigerated air cooled non-insulated conductor wires along with cooling a rear connector assembly, a cable assembly, a front connector assembly or handle assembly, a conductor tube assembly, and a nozzle assembly.

Further improvements were made in which air was used as a heat exchanger. Referring now to U.S. Pat. No. 6,005,221 (Cusick), entitled "Pressurized air cooled tungsten inert gas welding apparatus". This invention was directed toward an improved tungsten insert gas (TIG) arc welding process, having a means to remove heat energy using pressurized air, and a method for removing the heat away from the torch head area. A source of pressurized air was delivered though a hose to the torch head, and directed through heat conductive air tube coils within the torch head. As the air moved through the coils, it acquired some of the heat energy within the welding head. The heated air was then vented into an outer jacket, which contains the electrically conductive cables, and an airspace surrounding the cables. As the heated air moved toward a rear connector block, it contacted the length of the cables, and was further able to transfer some of the heat to the cables. This allowed some of the heat energy contained within the pressurized air to be transferred through physical contact to the metal cable, so that as the air moved farther along the length of the metal cable, it transferred more of its heat energy.

Use of heat exchanging/removal substances directly on surfaces being welded was shown in U.S. Pat. No. 6,168,843 (Hallo), entitled "Method for dissipating heat". In this invention, a method was shown for increasing the dissipation of heat from one portion of a surface when heat was applied to another portion of the same surface. A composition of a gel or paste with high water content and a thickener of a mineral clay in a colloidal suspension was used. This system had problems associated with the need to make all of the various applications of the gel or paste, and due to the time constraint requirements, was virtually unworkable in a robotic setting.

SUMMARY OF THE INVENTION

This invention and method process combines the benefits of heat extraction, using not only water, but also with the use of air supplying a volume area usable as a means to transport water that has undergone conversion to steam away from the welding head. This invention avoids problems of the risk of electrical shock, while still using water, or any liquid capable of undergoing a phase change from liquid to gas when absorbing a significant amount of heat energy per unit of liquid during the phase change, as compared to heat absorption per unit without any phase change, to absorb vast quantities of heat.

Water is a cheap and readily available heat transfer means, which is undoubtedly why it was originally used in the inventions cited above. The problems with water usage, however, drove the inventive ideas of people using these products to turn to air as a means to remove heat. It is clear that a greater quantity of air is required to achieve the same heat removal properties that a much smaller quantity of water is capable of doing, and thus volumes of air needed to be pumped through the system. While remaining a better alternative than liquid water, it still could only provide reasonable cooling.

What was not considered in any of the above inventions, was the incredible heat absorption capacity of water during an evaporation process. The absorption of heat by a substance always produces some change. In addition to thermal expansion, its temperature may rise or it may undergo a phase change in which its physical characteristics are altered without a change in temperature. This is the difference between "specific heat", which considers the number of calories or heat energy units required to raise the temperature of one gram of a substance one degree Celsius. The amount of heat transferred during changes of phase is called "latent heat". The heat of vaporization for water is extremely large because of the strong attraction between water molecules and the consequently large amounts of energy that must be expended to separate then into the vapor state. For water, the latent heat of vaporization to convert water to steam, where both remain at 100 degrees Celsius is 540 cal/g.

Steam, by its very nature of being in an excited state, requires a great deal more volume then it's a previous liquid state. None of the above inventions provide for the transfer of latent heat energy, and are thus restricted to much lower levels of heat energy transfer, since they must rely solely on "specific heat" transfers.

This invention takes advantage of the "latent heat" transfer, by providing a small quantity of water which is directed through a common atomizer, and then directed into the welding head unit so it can contact those parts of a welding head that absorb great quantities of heat. The atomized water, being presented in a mist form, is able to fill the airspace provided, contact a heated nozzle, and quickly convert into steam which is then able to be injected directly out of the rear of the arc welding nozzle, away from the user. The amount of water used, and thus the amount of steam generated, is extremely small, especially when used in conjunction with other cooling methods. Typically, the user will not even see any appreciable amount of steam exiting the apparatus.

Using only liquid water in the prior art forms shown above, are vastly inefficient as compared with the present invention. For example, a cubic centimeter of water, introduced to absorb heat, where the water is 25 degrees Celsius, is only able to absorb 75 calories of heat, before being expelled for cooling. Then, there is the problem of cooling the water, if it is going to be recycled through the system. Contrast the same cubic centimeter of water with the atomizer steam process, and the ability to absorb heat, has the same cubic centimeter of water absorbing the 75 calories, plus an additional 540 calories that is required to convert the water to steam, for a total of 615 calories. This is over eight times as efficient as the liquid water transfer. The efficiency is further enhanced, since the atomized water, having such a small diameter size, is able to undergo the steam conversion virtually immediately when contacting an extremely hot welding head. This makes quicker use of the latent energy transfer, since only small amounts of atomized water are contacting the hot surfaces at any given time, so that they are raised to 100 degrees Celsius almost immediately, and then undergo the acquisition of latent heat, which is the actual efficient energy transfer. By using an atomizer, the efficiency of the system is virtually always using latent heat exchange.

Using atomized water allows a mist to be introduced to the heated portions of the welding apparatus. This does not cause temperature gradient stress on the parts of the apparatus, that would otherwise occur if a quantity of liquid were simply splashed onto the part. The instantaneous boiling would produce a problem with the rapid expansion of steam, as well as cause the parts themselves to be subject to cracking and other degradations.

The advantages of this innovative system, being able to rely on latent heat transfer is quickly realized when the welding itself is ceased, and the welding apparatus is able to be touched with unprotected human hands within seconds of the termination of the welding. Interchanging parts is able to be done immediately, with the chief benefit, however, being that the parts do not absorb significant amounts heat that causes them to degrade. Therefore, repairs to a welding apparatus are minimized. This system does not produce vast quantities of steam that put other workers at risk, or introduce undesirable amounts of water vapor against other objects.

It is therefore the object of this invention to provide an improved welding apparatus that is able to remove undesired quantities of heat energy from a welding apparatus, with the heat transfer being done virtually immediately through use of latent energy transfer.

It is also a further object of this invention to provide an improved method of removing undesired quantities of heat energy from a welding apparatus, with the heat transfer being done virtually immediately through use of latent energy transfer with atomizer water vapor converted to steam.

It is also a further object of this invention to provide an apparatus and method suitable for robotic, semi-automatic and automatic welding apparatus, that allows continuous use of a welding apparatus with only minimal repairs necessary to the welding apparatus due to heat degradation.

DESCRIPTION OF THE FIGURES

FIG. 1 depicts a side and partially cross-sectional view of the improved latent energy removal welding apparatus, showing the injection port and cavity surrounding the nozzle.

FIG. 2 is an enlarged cross-sectional view of the liquid receiving line, and a partial cross-sectional view of parts within the welding apparatus.

FIG. 3 is a perspective view of a liquid reservoir, showing an intake line and output line.

DETAILED DESCRIPTION OF THE INVENTION

This invention is for an improved heat removal apparatus and method, for a welding gun assembly. The improvements are in regard to prior art welding head assemblies. Specifically, it is an improvement for the type of welding apparatus shown and specified in U.S. Pat. No. 5,248,868 (Cusick). Although U.S. Pat. No. 5,248,868 (Cusick) is a metal inert gas ("MIG") type apparatus, the improvements shown in this specification should be construed as being those for a tungsten inert gas ("TIG") type welding apparatus. The apparatus and method are also applicable as improvements to U.S. Pat. No. 4,864,099 (Cusick) and U.S. Pat. No. 6,005,221 (Cusick). This improved heat removal apparatus and method is useful in the area of robotic, semi-automatic and automatic welding equipment, since these systems generally operate so that multiple welding apparatus are used in an assembly line system. Maintenance on even one welding apparatus inevitably causes shutdown or delay of the assembly line system. It is imperative that necessary maintenance be limited as much as possible, in order to maintain productivity in a robotic and automated assembly line setting. This improved heat removal apparatus and method allows those parts of the welding apparatus that are subjected to tremendous levels of latent heat energy to remain substantially cooler than previously experienced under any prior art apparatus or method. When the welding apparatus becomes extremely hot, during the welding process, there is a degradation and deformation of metal that occurs. When this degradation and deformation becomes significant enough, this causes the typical nozzle to function inadequately, necessitating replacement and undesired down time. An example of this degradation would be where the metal parts acquire sufficient heat so as to undergo a malleable condition, where particulate matter from the welding process can impact and impregnate into the metal itself. Where this impregnation of particulate matter builds up on the inside bore of a shield or nozzle head, it can interfere with the flow of shielding gasses necessary during welding. Use of this improved heat removal apparatus and method dramatically extends the working life of the nozzle and associative parts that would typically have to be replaced.

A welding gun assembly generally comprises a nozzle assembly, which surrounds the area in which the actual welding occurs. U.S. Pat. No. 4,864,099 (Cusick, III) references and depicts the nozzle assembly in its FIG. 2. U.S. Pat. No. 5,248,868 (Cusick, III) and depicts its nozzle assembly in its FIG. 15. Both of the above referenced patent's deal with apparatus using what is commonly known as MIG welding equipment. U.S. Pat. No. 6,005,221 (Cusick, III) deals with what is commonly referred to as a TIG welding apparatus. As that patent references, in its FIG. 10, a "shielding barrel" is referenced as No. 24 and FIG. 10, and functions in a manner similar to the "nozzle" referenced in the prior Cusick, III patents.

In all three of these patents, the nozzle and inert gas shielding barrel provides similar functions, and both are able to be attached to the welding apparatus in a similar manner. The improved nozzle apparatus and method described in depicted in this application are usable with both the MIG and TIG arc welding apparatus described in the prior patents referenced above. Further, the improved nozzle and method are usable by itself, or in combination with any of the prior cooling methods described in the prior Cusick, III patents, as well as seen in other various prior art welding apparatus.

Referring now to the drawings, an improved nozzle assembly 10 is shown in FIG. 1. As stated above, this nozzle assembly 10 is usable with both the tungsten inert gas, or "TIG" arc welding system, or "MIG" arc welding system. The improved nozzle assembly 10 may be either screwed on to an existing welding head, or may slide on and be fixed in place through friction, be held in place with a clamp, or any other means, mechanical or otherwise, commonly known in the art to secure a nozzle assembly 10 to a welder head or any parts thereof. In either case, the improved nozzle assembly 10 is attached to a welding head and surrounds the contact portion of the welding apparatus. In a MIG type apparatus, this would be the contact tip containing a wire electrode, (such as that shown in U.S. Pat. No. 5,248,868 (Cusick, III) and in a TIG type apparatus, this would be a tungsten electrode rod, such as that shown in U.S. Pat. No. 6,005,221 (Cusick, III)).

Referring again specifically to FIG. 1 and also to FIG. 2, the improved nozzle assembly 10 is shown. The nozzle assembly 10 is comprised of an outer shroud 30, which comprises a tubular member that has an internal diameter bore. A nozzle housing 21 is contained within an outer shroud 30, with the internal diameter bore of the outer shroud 30 being greater than the nozzle housing 21. The nozzle housing 21 preferably has an exterior shape that is similar to the internal diameter bore of the outer shroud 30, so that the nozzle housing 21 may be situated within the outer shroud 30, so that a uniform airspace 12 is defined between the nozzle housing 21 and outer shroud 30. Various shapes and configurations may be used, and it is not a requirement of this invention, nor should it be construed as such, that the airspace 12 be uniform on all sides of the nozzle housing 21. Preferably, both the nozzle housing 21 and outer shroud 30 will be constructed of a resilient metal tubing, and it is preferable that the outer shroud 30 and nozzle housing 21 have respective sizes and shapes that allow airspace 12 to exist between them at all points of circumference.

To construct this improved nozzle 10, the nozzle housing 21 is placed within the confines of the outer shroud 30. The outer shroud 30 is crimped to the nozzle housing 21 at a point where the nozzle housing 21 begins to taper 26. Although FIG. 1 and FIG. 2 depict the optimal construction of this improved nozzle assembly 10, the outer shroud 30 may be crimped at other areas along the length of the nozzle housing 21.

An airspace 12 will exist between the outer shroud 30 and the nozzle housing 21. As stated above, preferably, this airspace 12 should uniformly exist around the entire outer surface area of the nozzle housing 21. The airspace 12 should have enclosed front end, defined by an area in which the outer shroud 30 is crimped to the nozzle housing 21, and an open end defined by the rear end of the nozzle housing 21, and the outer shroud 30.

The nozzle housing 21 has an insulator sleeve fixed within it, which surrounds a metal insert 24. As is depicted in FIG. 1 and FIG. 2, this metal insert 24 defines internal threads 25, which allow the improved nozzle 10 to be screwed on to a typical conductor tube 50, having a threaded end which is able to be inserted and screwed into the metal insert 24. It should not be considered to be a limitation of requiring threaded portions to secure the improved nozzle assembly 10 onto a welding head. Preferably, threaded ends are used, which allow for robotic repairs to be accomplished automatically through a preordained positioning and twisting movement. The metal insert may be devoid of a threaded portion, and may simply be placed onto a metal nozzle insert using friction as the means to hold the improved nozzle assembly 10 in position, as well as using any other means, mechanical or otherwise to secure the nozzle assembly. In either manner, being through threaded ends, or through simple friction insertion, the improved nozzle assembly 10 is positioned on the end of a welding TIG or MIG apparatus. The tapering front end 25 of nozzle housing 21 typically surrounds the diffuser portion of a typical welding apparatus, and the contact tip assembly (in a MIG apparatus) or a tungsten rod in a TIG apparatus.

The outer shroud 30 defines at least one hole 49 which has a sufficient diameter so as to allow the contents from a liquid receiving line 48 to move from said water vapor receiving line 48, through the outer shroud 30, and into airspace 12. The defined hole 49 may be at various locations on the shroud 30, but is optimally defined as close to the front of the barrel portion of the outer shroud 30, where the heat from the arc welding process is the highest, with said hole 49 preferably to the immediate rear of the tapered area 26. In this manner, the contents of the vapor receiving line 48 will be deposited through a shroud 30 into the forward-most portion of the apparatus 10.

The vapor receiving line 48 is typically constructed of a tubular metal that is rigidly a fixed to the outer shroud 30 with its front open end secured so that all liquid moving through said line 48 is deposited into airspace 12. Typically, the vapor receiving line 48 may be secured to the outer shroud 30 using a clamp 80, or other similar means, whereby said clamping means 80 secures a length of the vapor receiving line 48 to said outer shroud 30.

The other end of the vapor receiving line 48 is defined by a quick disconnect 46, which allows it to be joined to a liquid delivery line 41, which also has an end defined by a quick disconnect 45 for fast and easy maintenance. These quick disconnects 45 and 46 are able to be joined together by a connector 47, so that any liquid moving through delivery line 41 will automatically move into and through the receiving line 48.

Referring now also to FIG. 3, liquid is pumped from a remote unit, in which a storage tank 43 has a supply of water 44, which is delivered to an atomizer pump 40, which converts the water 44 into a vapor mist, by combining water 44 and a supply of air from an air delivery tube 42, and causing the water and air to be pressurized into a liquid mist, which is then directed into the liquid delivery tube 41. The liquid moves through the liquid delivery line 41, into and through the vapor receiving line 48, through hole 49, and into airspace 12. As is stated, the liquid may be directed using any type of pump means, as well as any type of gravity fed system, including siphons, etc. FIG. 3 depicts a pump, but the same figure is applicable to a system where no powered pump is used, but only a gravity fed type system is used. For purposes of discussion and description given here, when discussing a "liquid delivery means", that this is synonymous with a pump means, gravity fed means, or any other type of pumping or liquid delivery system that would be capable of transporting liquid to the nozzle assembly 10.

The liquid delivery means should be understood as comprising a pump system 40, which may have a metering means 48 to control the amount of liquid 44 being pumped through the line 41. The liquid delivery means should also be understood as also comprising a gravity feed means, in which liquid 44 is stored in a tank 43, and allowed, through the effect of gravity, a siphon, or venturi principle system, to move downward through line 41 to move through line 48 and into airspace 12. Said gravity delivery means may also have a metering means 48, which controls the amount of liquid able to move through line 41.

While typical liquid is the cited example of the optimal method of using this apparatus and process, the same pump 40 in FIG. 3 may still operate effectively without an atomizer process within said pump 40. Delivery of liquid instead of atomized liquid vapor, may also be used. The advantage of atomized liquid vapor is its ability to immediately spread throughout the airspace 12 upon introduction into said airspace 12. Where water is the liquid used, liquid water will also have the same heat absorption capacity per unit volume as the atomized water vapor, since both are being delivered in a liquid state. The water vapor is liquid water in an atomized state, in which the liquid has been broken down into very small droplets. It has not undergone any phase change from liquid to gas when it is in an atomized state. It should be understood that water is not the only liquid capable of being used with this apparatus and process. The term water 44 should also be construed to include any liquid that is subject to a phase change from a liquid state to a gas state during the absorption of a significant amount of heat per unit volume when it undergoes a phase change from liquid to gas, as compared with the absorption of heat capabilities when remaining in a liquid state. For purposes of the remaining portion of the description of this invention, water will be assumed to be the liquid used, since it is readily available, inexpensive, and has a minimal amount of undesired side effects. Further, for purposes of discussion, it will be assumed that the liquid water will be atomized, since the atomization process allows the liquid to more fully move through the airspace 12 prior to actual contact with the exterior of the nozzle housing 21. Atomized water and liquid water maintain the same properties.

During the welding process, extremely high temperatures are created at the point where the actual welding occurs, which is toward the front end 25 of the nozzle housing 21. This heat will also travel up the contact tip assembly (not shown) which is located within the nozzle housing 21, and be absorbed quickly into the nozzle housing 21.

When atomized water vapor enters into the airspace 12, it will be able to contact the outer side of the nozzle housing 21. If the airspace 12 exists all the way around the nozzle housing 21, the water vapor will be able to make contact generally around the entire circumference of the nozzle housing 21, which allows for optimal heat transfer. As the water vapor makes contact with the nozzle housing 21, it will be converted from atomized water into steam, undergoing a phase change, and absorbing significant amounts of heat energy directly from the nozzle housing 21.

When the atomized water undergoes a phase change into steam, the amount of volume it will attempt to occupy will greatly increase. This will cause the steam to exert a pressure within the airspace 12, and which will then cause the steam to move to an area of lower pressure, which is out to the rear 58 of the improved nozzle assembly 10, and exiting into the atmosphere.

For further clarity, directional arrows 15 are shown in FIG. 2, indicating that the liquid moves through line 48, into airspace 12, where it moves along the airspace making contact with the outer side of the nozzle 21, where it absorbs sufficient heat to cause the liquid to convert from liquid to gas, or steam if using water, where said gas is able to vent directly out of the rear 58 of the improved nozzle assembly.

There is no significant generation of steam, as the absorption of latent heat energy from the nozzle housing 21 is an ongoing process, and the creation of steam water vapor is generally minimal. Since such a large amount of heat energy can be its orbit by small amount of atomized water undergoing a phase change, there is little risk of injury to a person using the improved nozzle assembly 10, even where the heated steam water vapor is exiting directly from the rear 58 of the improved nozzle assembly 10.

The benefits of cooling inherent in using atomized water that is allowed to undergo a phase change the heated steam is significant. For example, after welding has been completed, the typical temperature of the end of the improved nozzle assembly 10 could easily be in excess of 1000 degrees Fahrenheit, if no cooling means were employed. Using a water atomizer cooling means, as described above, not only is the improved nozzle assembly 10 subjected to a much lower operating temperature, but the amount of cooling is dramatically seen after the welder is shut off, and the contact tip can be handled using bare skin, within a few seconds after the welding has terminated. This would not be accomplished or possible using forced air cooling means, or using liquid cooling means, where no phase change occurs.

The metal parts commonly used in welding nozzle assemblies undergo dramatic heat absorption, and they do tend to wear out very quickly during use. Since the changing of nozzle assemblies is a cumbersome and rather expensive procedure, this innovative manner of removing latent heat during the welding process allows the improved nozzle assembly 10 to last significantly longer than prior art nozzle assemblies.

The amount of water 44 used his extremely small, since the entire latent heat removal process is accomplished through a complete conversion of atomized water to steam. This will not cause a significant increase in the desired humidity in the workplace.

From the foregoing statements, summary and description in accordance with the present invention, it is understood that the same are not limited thereto, but are susceptible to various changes and modifications as known to those skilled in the art and we therefore do not wish to be limited to the details shown and described herein, but intend to cover all such changes and modifications which would be encompassed by the scope of the appended claims.

I claim:

1. A vapor cooled nozzle, suitable for use in the MIG and TIG arc welding process, comprising:
   a. an outer shroud;
   b. a nozzle, disposed within the outer shroud, having an external diameter less than the internal diameter of the outer shroud, where said nozzle is positioned within the outer shroud so as to define an airspace between the outer shroud and the nozzle, where said airspace is defined as an open rear end between said shroud and nozzle;
   c. a liquid delivery means, which directs liquid into the airspace between said shroud and nozzle, where said liquid is able to contact the exterior surface of the nozzle and where any vaporized liquid is able to exit the nozzle through the open rear end.

2. A vapor cooled nozzle, suitable for use in the MIG and TIG arc welding process, as recited in claim 1, in which the outer shroud comprises a tubular member.

3. A vapor cooled nozzle, suitable for use in the MIG and TIG arc welding process, as recited in claim 1, in which the outer shroud is crimped to the front portion of the nozzle.

4. A vapor cooled nozzle, suitable for use in the MIG and TIG arc welding process, as recited in claim 1, in which the liquid used is water.

5. A vapor cooled nozzle, suitable for use in the MIG and TIG arc welding process, as recited in claim 1, in which the liquid delivery means comprises a liquid receiving line which directs liquid through a hole defined in the outer shroud.

6. A vapor cooled nozzle, suitable for use in the MIG and TIG arc welding process, as recited in claim 1, in which the liquid delivery means comprises a pump means.

7. A vapor cooled nozzle, suitable for use in the MIG and TIG arc welding process, as recited in claim 1, in which the liquid delivery means comprises a gravity-fed liquid delivery line.

8. A vapor cooled nozzle, suitable for use in the MIG and TIG arc welding process, as recited in claim 1, in which the nozzle is attachable to a conductor tube assembly.

9. A vapor cooled nozzle, suitable for use in the MIG and TIG arc welding process, comprising:
   a. an outer shroud;
   b. a nozzle, disposed within the outer shroud, having an external diameter less than the internal diameter of the outer shroud, where said nozzle is positioned within the outer shroud so as to define an airspace between the outer shroud and the nozzle, where said airspace has a closed forward end, and an open rear end;
   c. a liquid delivery means, which directs atomized liquid into the airspace between said shroud and nozzle, where said liquid is able to contact the exterior surface of the nozzle and absorb sufficient heat to cause said atomized liquid to undergo a phase change from liquid to a gas, with said gas able to vent out of the open rear end of the airspace.

10. A method of using liquid to cool a nozzle assembly, suitable for use in the MIG and TIG arc welding process, comprising the following steps:
    a. delivering liquid to an airspace that is defined between a nozzle and an outer shroud, so that said liquid is able to contact the outer surface of the nozzle;
    b. allowing the liquid to absorb sufficient heat so as to undergo a phase change from liquid to a heated gas;
    c. allowing the heated gas to vent from the airspace.

11. A method of using liquid to cool a nozzle assembly, suitable for use in the MIG and TIG arc welding process, as recited in claim 10, in which the delivery of a liquid to the airspace is accomplished using a gravity-fed liquid delivery line.

12. A method of using liquid to cool a nozzle assembly, suitable for use in the MIG and TIG arc welding process, as recited in claim 10, in which the liquid is delivered through a pump, and through a liquid delivery line.

13. A method of using liquid to cool a nozzle assembly, suitable for use in the MIG and TIG arc welding process, as recited in claim 10, in which the liquid is delivered in an atomized liquid vapor state.

14. A method of using liquid to cool a nozzle assembly, suitable for use in the MIG and TIG arc welding process, as recited in claim 10, in which the heated gas is vented from the rear of the nozzle assembly.

* * * * *